United States Patent
Ono et al.

(10) Patent No.: US 8,671,773 B2
(45) Date of Patent: Mar. 18, 2014

(54) ELECTRONIC FLOW METER

(75) Inventors: Yoshiharu Ono, Kanagawa (JP); Osamu Karino, Kanagawa (JP); Yoshihiro Shimizu, Kanagawa (JP); Yoshihiro Miyagawa, Kanagawa (JP); Hiroyuki Kawajiri, Kanagawa (JP); Takehiro Furukawa, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 92 days.

(21) Appl. No.: 13/482,873

(22) Filed: May 29, 2012

(65) Prior Publication Data

US 2012/0304779 A1    Dec. 6, 2012

(30) Foreign Application Priority Data

Jun. 2, 2011   (JP) ................................. 2011-124240

(51) Int. Cl.
*G01F 1/56*       (2006.01)
(52) U.S. Cl.
USPC ....................................................... 73/861.08
(58) Field of Classification Search
USPC ....................................................... 73/861.08
See application file for complete search history.

(56) References Cited

U.S. PATENT DOCUMENTS

| 8,166,825 B2 * | 5/2012 | Zhou .............................. 73/655 |
| 8,544,313 B2 * | 10/2013 | Hirose et al. ................... 73/1.09 |
| 2009/0058405 A1 * | 3/2009 | Oike et al. ............... 324/207.25 |

FOREIGN PATENT DOCUMENTS

JP           10-246662        9/1998

* cited by examiner

*Primary Examiner* — Jewel V Thompson
(74) *Attorney, Agent, or Firm* — McDermott Will & Emery LLP (57) ABSTRACT

An electronic flow meter includes a magnetic sensor, phase-A and phase-B drivers, a phase-A comparator, a phase-B comparator, a two-phase encoder, and a rotational speed timer. The two-phase encoder determines a normal/reverse direction where the impeller is rotated based on event signals sampled by the phase-A and the phase-B comparators, respectively, causing a counter to count up or to count down according to the normal/reverse direction as determined, thereby outputting an event count signal. The rotational speed timer calculates a rotational frequency of the impeller from the event count signal outputted by the two-phase encoder and sets frequencies of respective sampling signals of the phase-A and the phase-B comparators at a time when the rotational frequency of the impeller is measured next, and respective drive periods of the phase-A and the phase-B drivers in accordance with the rotational frequency of the impeller as calculated.

6 Claims, 9 Drawing Sheets

| ROTATIONAL FREQUENCY (FLOW RATE) | SENSOR SENSITIVITY | DRIVE PERIOD | | COMPARATOR |
|---|---|---|---|---|
| | | DUTY RATIO | FREQUENCY | SAMPLING FREQUENCY |
| HIGH | HIGH | 80% | MIDDLE - HIGH | MIDDLE - HIGH |
| | LOW | 90% | HIGH | HIGH |
| MIDDLE | HIGH | 50% | MIDDLE | MIDDLE |
| | LOW | 60% | MIDDLE | MIDDLE |
| LOW | HIGH | 10% | LOW | LOW |
| | LOW | 20% | MIDDLE | MIDDLE |

ELECTRONIC FLOW METER

CROSS-REFERENCE TO RELATED APPLICATIONS

The disclosure of Japanese Patent Application No. 2011-124240 filed on Jun. 2, 2011 including the specification, drawings, and abstract is incorporated herein by reference in its entirety.

BACKGROUND

The present invention relates to an electronic flow meter, and in particular, to an electronic flow meter for magnetically detecting a rotational frequency of a rotator rotating according to a flow rate of a fluid.

An electronic flow meter utilizing a magnetic sensor has lately been adopted for a water meter, and so forth. In the case where the electronic flow meter is adopted for the water meter, and so forth, it is difficult to supply power from outside, and therefore, a battery is generally used as a power source. For this reason, with the electronic flow meter, it is necessary to restrain an amount of current consumed in order to extend the service life of the battery.

The electronic flow meter, however, detects a flow rate of a fluid, and a flow direction of the fluid (a normal/reverse direction in which a rotator of the magnetic sensor is rotated) according to first and second signals outputted from the magnetic sensor, respectively. For this reason, the electronic flow meter has a need for causing the first and second signals outputted from the magnetic sensor, respectively, to respond quickly to a rotational speed of the magnetic sensor, and current is therefore supplied to the magnetic sensor at all times, so that the amount of current consumed has increased.

Accordingly, with the electronic flow meter disclosed in Japanese Unexamined Patent Publication No. Hei10 (1998)-246662, a cycle of sampling first and second signals outputted from the magnetic sensor, respectively, is varied according to a flow rate in stages of a low speed, an intermediate speed, and a high speed, and the magnetic sensor is intermittently supplied with current in such a way as to match variation in the cycle of sampling, thereby causing a decrease in current consumption.

SUMMARY

With the electronic flow meter disclosed in Japanese Unexamined Patent Publication No. Hei10 (1998)-246662, however, a problem has been encountered in that since the cycle of sampling the first and second signals outputted from the magnetic sensor, respectively, is varied in only three stages of the low speed, the intermediate speed, and the high speed according to a flow rate, it is not possible to sufficiently reduce an amount of current supplied to the magnetic sensor.

Further, with the electronic flow meter disclosed in Japanese Unexamined Patent Publication No. Hei10 (1998)-246662, since it is simply the case where the magnetic sensor is intermittently supplied with current in such a way as to match the variation in the cycle of sampling in the three stages of the low speed, the intermediate speed, and the high speed, there has exited a problem that the magnetic sensor is unable to obtain an amount of current necessary for outputting the first and second signals, respectively, due to fluctuation in sensor sensitivity of the magnetic sensor, and the magnetic sensor is unable to stably detect the rotational frequency of a rotator.

The invention, therefore, has been developed in order to solve the problem, and it is an object of the invention to provide an electronic flow meter capable of reducing an amount of current consumed by a magnetic sensor while stably detecting a rotational frequency of a rotator by use of the magnetic sensor.

According to one aspect of the invention, there is provided an electronic flow meter including magnetic sensors, drivers, a first comparator, a second comparator, a two-phase encoder, and a rotational speed timer. The magnetic sensors magnetically detect a rotational frequency of a rotator rotating according to a flow rate of a fluid, outputting first and second signals, respectively, according to the rotational frequency of the rotator, as detected. The drivers control the magnetic sensors, respectively. The first comparator samples the first signal outputted by the magnetic sensor on the basis of a sampling signal. The second comparator samples the second signal outputted by the other magnetic sensor on the basis of the sampling signal. The two-phase encoder 6 determines whether the rotator is rotating in a normal direction or a reverse direction on the basis of the first and second signals sampled by the first and second comparators, respectively, and causes a counter to count up or to count down according to the normal or the reverse direction as determined, thereby outputting an event count signal. The rotational speed timer calculates the rotational frequency of the rotator from the event count signal outputted by the two-phase encoder, and sets frequencies of the respective sampling signals of the first and second comparators at a time when the rotational frequency of the rotator is measured next time, and respective drive periods of the drivers in accordance with the rotational frequency of the rotator as calculated.

With the electronic flow meter according to the invention, the frequencies of the respective sampling signals of the first and second comparators, and the respective drive periods of the drivers can be varied in accordance with the rotational frequency of the rotator, as detected by the respective magnetic sensors, so that it is possible to reduce an amount of current consumed.

DETAILED DESCRIPTION

Embodiments of the invention are described hereinafter with reference to the accompanying drawings.

First Embodiment

Figure 1:
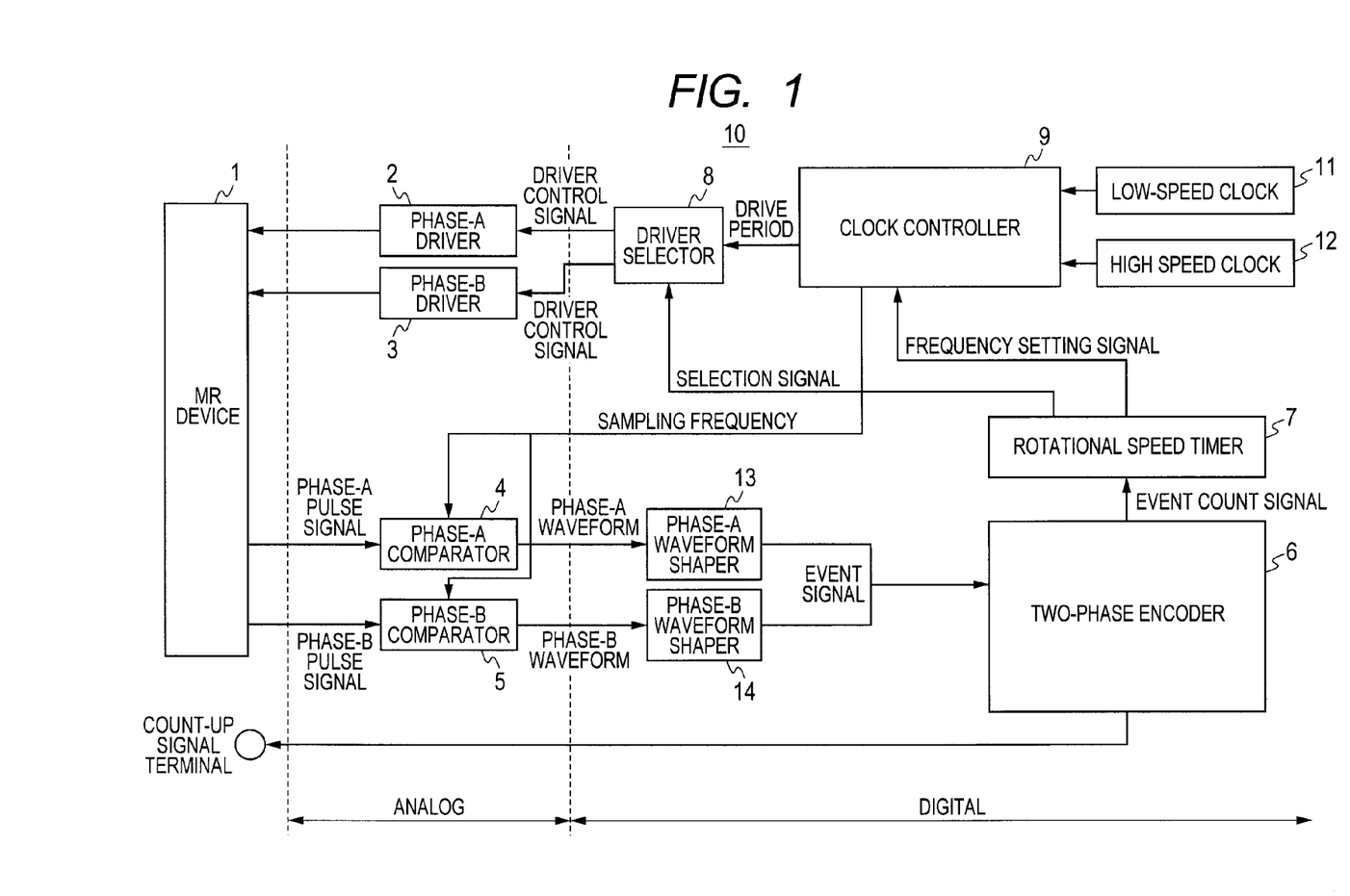
FIG. 1 is a block schematic diagram showing a configuration of an electronic flow meter according to a first embodiment of the invention.

FIG. 1 is a block schematic diagram showing a configuration of an electronic flow meter according to a first embodiment of the invention. An electronic flow meter 10 shown in FIG. 1 includes a magnetic sensor 1, a phase-A driver 2, a phase-B driver 3, a phase-A comparator (a first comparator) 4, a phase-B comparator (a second comparator) 5, a two-phase encoder 6, and a rotational speed timer 7.

Further, the electronic flow meter 10 includes a driving-driver selector 8 for selecting driving of either the phase-A driver 2, or the phase-B driver 3, and a clock controller 9 for generating frequencies of respective sampling signals (hereinafter referred to as sampling frequencies) of the phase-A comparator 4, and the phase-B comparator 5 during respective drive periods of the phase-A driver 2, and the phase-B driver 3, subsequently outputting the sampling frequencies. Further, the electronic flow meter 10 includes a low-speed clock 11, and a high speed clock 12, for use in supplying the clock controller 9 with a clock signal, respectively, a phase-A waveform shaper 13 for shaping a waveform outputted by the phase-A comparator 4, and a phase-B waveform shaper 14 for shaping a waveform outputted by the phase-B comparator 5.

The magnetic sensor 1 is provided opposite to a permanent magnet attached to a rotating shaft of an impeller (a rotator) rotating according to a flow rate of a fluid, and reads variation in magnetic force from the permanent magnet, caused by rotation of the impeller, thereby detecting a rotational frequency of the impeller. More specifically, the magnetic sensor 1 is an MR (Magneto Resistance) device, and the number of pulses, proportional to a rotation angle of the impeller, is generated due to variation in resistance of the MR device. Further, two units of the magnetic sensors 1 are provided such that the two units are 90 degrees apart from each other against the rotating shaft, and one of the two units is for a phase-A while the other is for a phase-B.

The phase-A driver 2 is a driver circuit for driving the magnetic sensor 1 for the phase-A, supplying current thereto during a drive period described later on. The phase-B driver 3 is a driver circuit for driving the magnetic sensor 1 for the phase-B, supplying current thereto during a drive period described later on.

The phase-A comparator 4 samples a signal corresponding to the sampling frequency on the basis of a pulse signal (a phase-A pulse signal/a first signal) proportional to the rotation angle of the impeller, detected by the magnetic sensor 1 for the phase-A, thereby outputting a phase-A wave signal. Further, the phase-B comparator 5 samples a signal corresponding to the sampling frequency on the basis of a pulse signal (a phase-B pulse signal/a second signal) proportional to the rotation angle of the impeller, detected by the magnetic sensor 1 for the phase-B, thereby outputting a phase-B wave signal.

Figure 2:
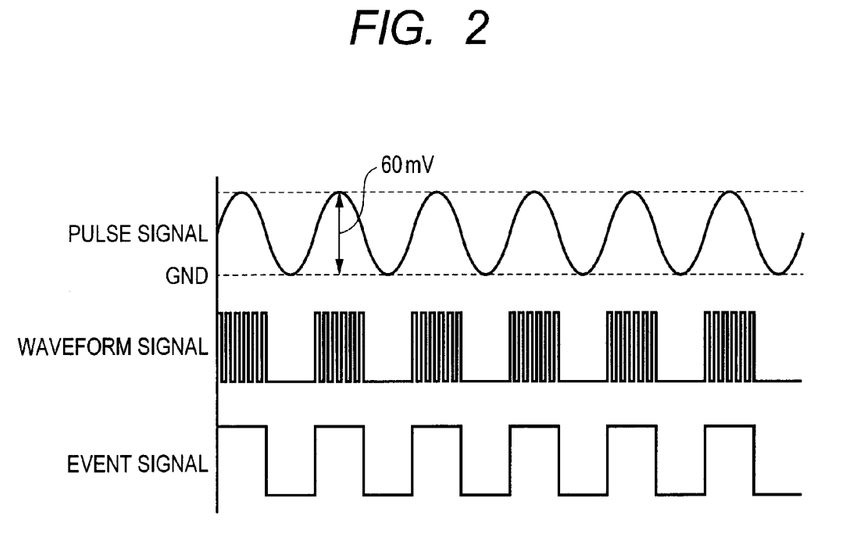
FIG. 2 is a waveform chart for describing signals outputted from a magnetic sensor of the electronic flow meter according to the first embodiment of the invention.

FIG. 2 is a waveform chart for describing signals outputted from the magnetic sensor 1 of the electronic flow meter 10 according to the first embodiment of the invention. As shown in FIG. 2, the magnetic sensor 1 outputs the phase-A or phase-B pulse signal of a sine-wave having a 60 mV amplitude. The phase-A comparator 4 or the phase-B comparator 5 outputs the phase-A or phase-B waveform signal obtained by sampling the phase-A or phase-B pulse signal according to the sampling frequency, as shown in FIG. 2, Further, the phase-A waveform shaper 13, or the phase-B waveform shaper 14 executes shaping of the phase-A or the phase-B waveform signal into a rectangular wave, thereby outputting the rectangular wave as an event signal to the two-phase encoder 6, as shown in FIG. 2. The phase-A waveform shaper 13 and the phase-B waveform shaper 14 are each composed of a latch circuit.

The two-phase encoder 6 determines the normal and the reverse direction in which the impeller is rotated on the basis of the phase-A or the phase-B waveform signal (the event signal after the shaping) sampled by the phase-A comparator 4 and the phase-B comparator 5, respectively. Further, the two-phase encoder 6 causes a counter to count up or to count down according to the normal or the reverse direction, as determined, thereby outputting an event count signal. More specifically, the two-phase encoder 6 determines the normal or the reverse direction in which the impeller is rotated by detecting a phase difference between the phase-A waveform signal, and the phase-B waveform signal, and causes the counter to count-up or to count down according to the phase difference, outputting a counter value within given time, as the event count signal.

Figure 3:
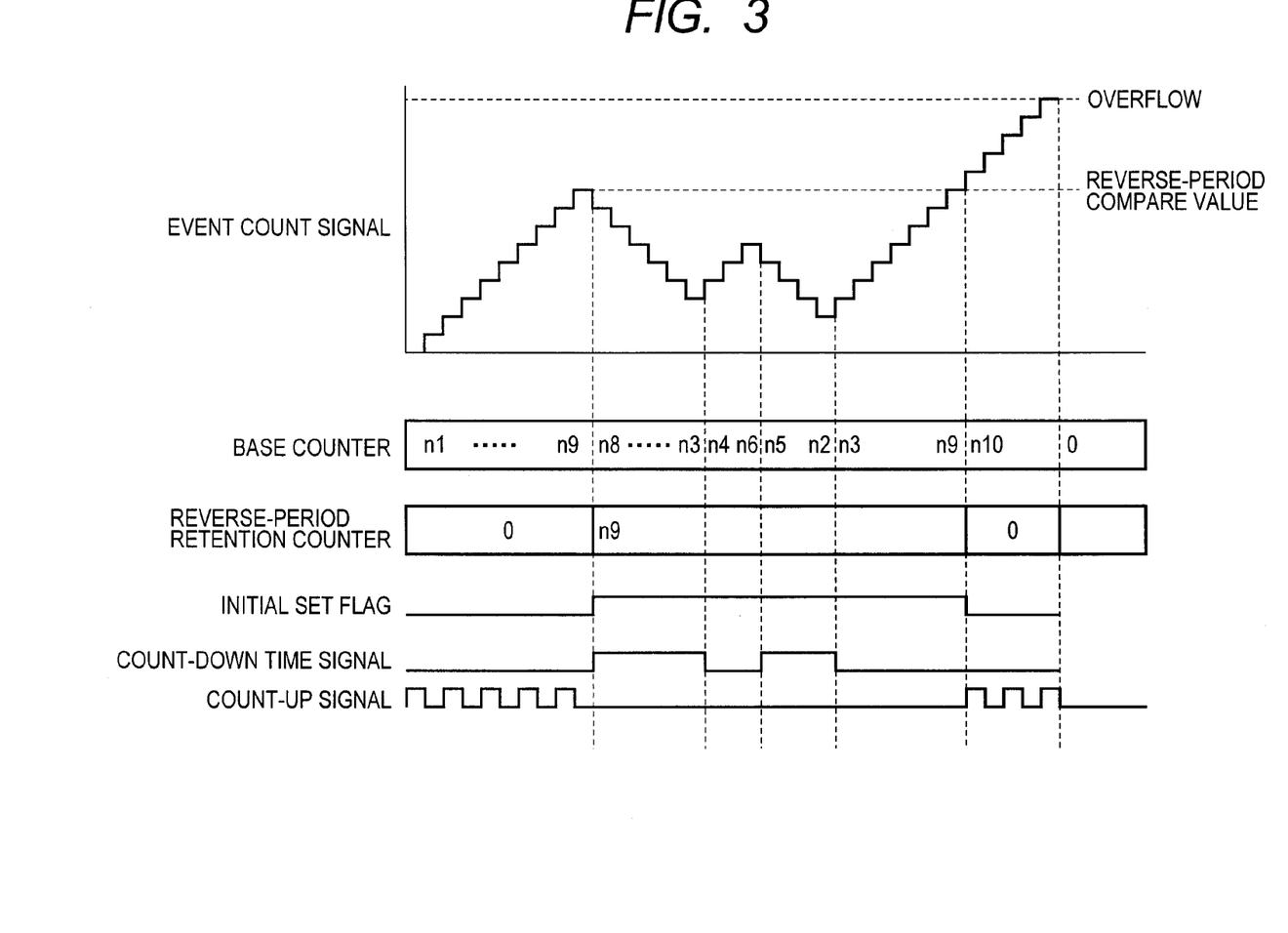
FIG. 3 is a waveform chart for describing an operation of a two-phase encoder 6 of the electronic flow meter according to the first embodiment of the invention.

FIG. 3 is a waveform chart for describing an operation of the two-phase encoder 6 of the electronic flow meter 10 according to the first embodiment of the invention. In FIG. 3 showing waveforms, there are depicted the event count signal, a base counter, a reverse-period retention counter, an initial set flag, a count-down time signal, and a count-up signal. The event count signal follows the base counter, counting first from "n1" up to "n9". The event count signal reaches a reverse-period compare value at a time when the base counter has counted up to "n9," retaining a count value "n9" in the reverse-period retention counter, whereupon the count-down time signal is turned "H".

The event count signal, after having reached the reverse-period compare value, follows the base counter, and counts down from "n8" to "n3". When the base counter has counted down to "n3", the count-down time signal is turned "L." After the count-down time signal has turned "L," the event count signal follows the base counter, counting from "n4" up to "n6." When the base counter has counted up to "n6", the count-down time signal is turned "H" again. After the count-down time signal has turned "H" again, the event count signal follows the base counter, counting from "n5" down to "n2." When the base counter has counted down to "n2," the count-down time signal is turned "L" again. After the count-down time signal has turned "L" again, the event count signal follows the base counter, counting from "n3" to up "n9." Further, the event count signal follows the base counter, and counts up from "n10," thereby reaching overflow.

The initial set flag is a flag signal that is turned "H" for the initial time at which the counter of the two-phase encoder 6 is activated. When the initial set flag is at "L," the two-phase encoder 6 outputs the count-up signal from a count-up signal terminal shown in FIG. 1.

Next, the rotational speed timer 7 calculates a rotational frequency of the impeller from the event count signal outputted by the two-phase encoder 6. Further, the rotational speed timer 7 outputs a frequency-setting signal to the clock controller 9 in accordance with the rotational frequency of the impeller as calculated, the frequency-setting signal being for use in setting the respective sampling frequencies of the phase-A comparator 4, and the phase-B comparator 5 at a time when the rotational frequency of the impeller is measured next time, and the respective drive periods of the phase-A driver 2, and the phase-B driver 3. Further, the rotational speed timer 7 outputs a selection signal for selecting a destination of a driver control signal to the driver selector 8.

Figure 4:
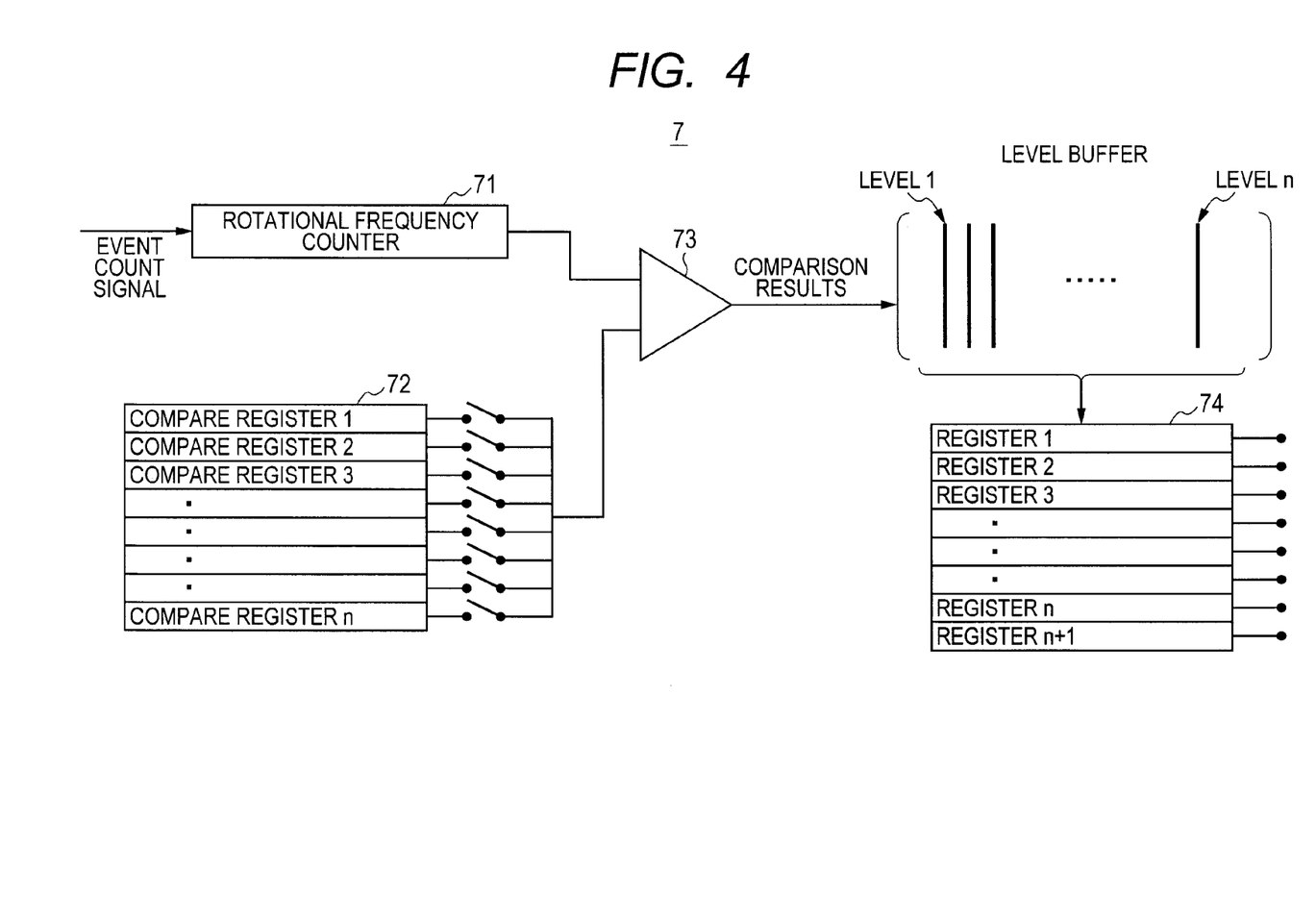
FIG. 4 is a block diagram showing a configuration of a rotational speed timer of the electronic flow meter according to the first embodiment of the invention.

FIG. 4 is a block diagram showing a configuration of the rotational speed timer 7 of the electronic flow meter 10 according to the first embodiment of the invention. The rotational speed timer 7 shown in FIG. 4 includes a rotational frequency counter 71, a compare register 72, a comparator 73, and a frequency-setting register 74.

The rotational frequency counter 71 calculates the rotational frequency of the impeller from the event count signal outputted by the two-phase encoder 6. The compare register 72 includes n-stages of compare registers, a rotational frequency threshold (a compare match) corresponding to a frequency to be set being retained in the compare registers in the respective stages. The comparator 73 compares the rotational frequency of the impeller, calculated by the rotational frequency counter 71, with the respective compare matches retained in the compare register 72, outputting a level according to a comparison result. The frequency-setting register 74 includes (n+1)-stages of registers, a set value of a frequency corresponding to a level outputted by the comparator 73 being retained in the registers in the respective stages.

Figure 5:
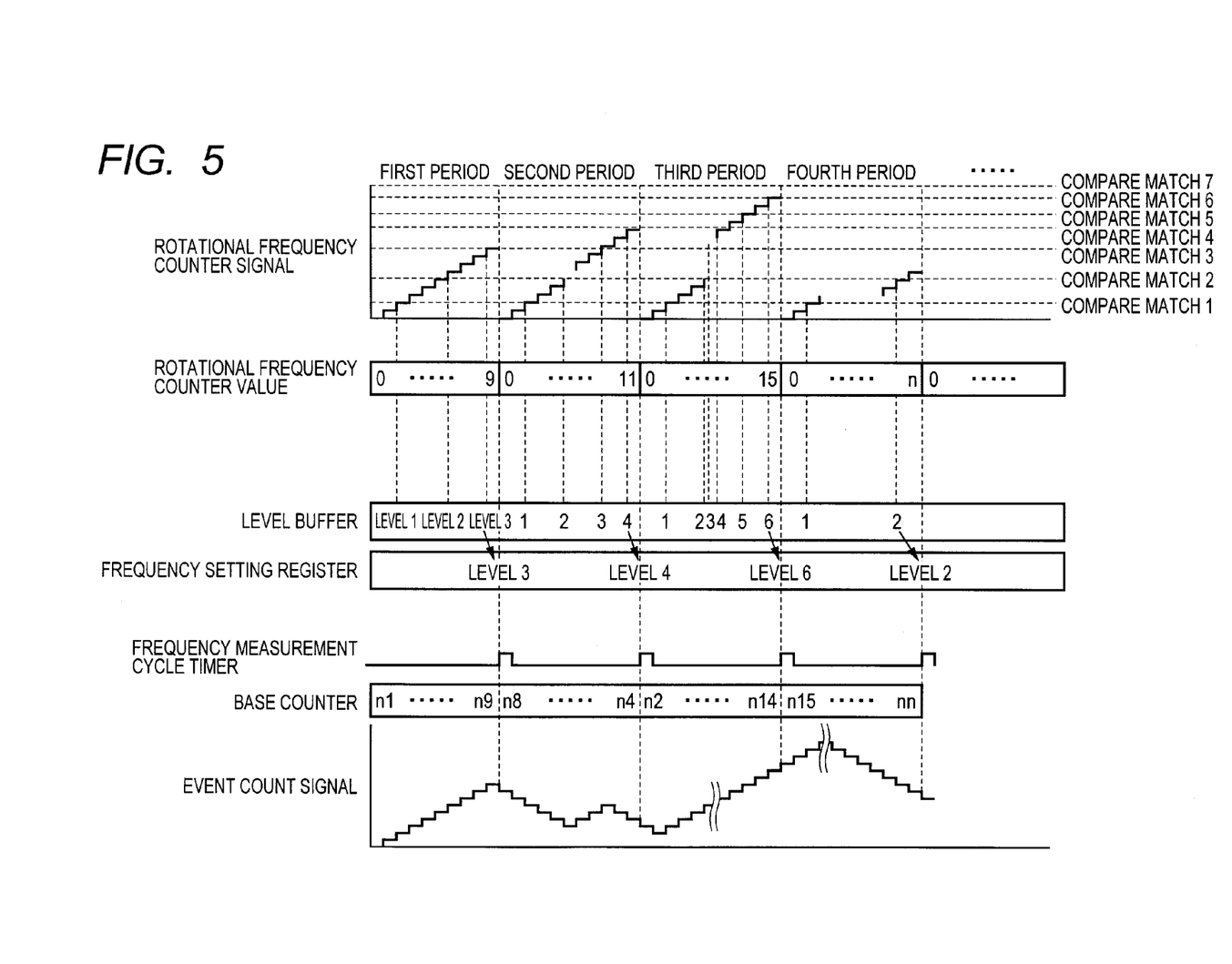
FIG. 5 is a waveform chart for describing an operation of the rotational speed timer of the electronic flow meter according to the first embodiment of the invention.

FIG. 5 is a waveform chart for describing an operation of the rotational speed timer 7 of the electronic flow meter 10 according to the first embodiment of the invention. In FIG. 5 showing waveforms, there are depicted a rotational frequency counter signal, a rotational frequency counter value, a level buffer, a frequency-setting register, and a frequency measurement-cycle timer. Further, the base counter of the two-phase encoder 6, and the event count signal are also depicted in FIG. 5 showing the waveforms.

The rotational frequency counter 71 follows the base counter of the two-phase encoder 6 during a period from inputting of the frequency measuring-cycle timer at "H" until inputting of the next frequency measuring-cycle timer at "H", counting the rotational frequency counter value by starting from "0". In a first period shown in FIG. 5, the rotational frequency counter 71 counts the rotational frequency counter value from "0" to "9". Similarly, the rotational frequency counter 71 counts the rotational frequency counter value from "0" to "11" in a second period, and from "0" to "15" in a third period, respectively, counting the rotational frequency counter value from "0" to "n" in a fourth period.

The comparator 73 compares the rotational frequency counter signal shown in FIG. 5 with the respective compare matches 1 to 7, retained in the compare register 72, and respective levels corresponding to the compare matches 1 to 7, matching the rotational frequency counter signal, are retained in the level buffer. The comparator 73 retains the level 1 in the level buffer when the rotational frequency counter value is "2", the level 2 in the level buffer when the rotational frequency counter value is "6", and the level 3 in the level buffer when the rotational frequency counter value is "9", respectively, during a first period. Similarly, the comparator 73 retains the levels 1 to 4 in the level buffer during a second period, the levels 1 to 6 in the level buffer during a third period, and the levels 1 to 2 in the level buffer during a fourth period, respectively.

The frequency-setting register 74 reads a set value of a frequency at the level retained in the level buffer immediately before the frequency measurement-cycle timer is turned "H", and outputs the set value as the frequency-setting signal to the clock controller 9. In the second period, the frequency-setting register 74 reads a set value of a frequency at the level 3 retained in the level buffer immediately before the frequency measurement-cycle timer is turned "H" (in the first period). Similarly, the frequency-setting register 74 reads a set value of a frequency at the level 4 retained in the level buffer immediately before the frequency measurement-cycle timer is turned "H" (in the second period) in the third period, and a set value of a frequency at the level 6 retained in the level buffer immediately before the frequency measurement-cycle timer is turned high (the third period) in the fourth period, respectively.

Now, reverting to FIG. 1, the clock controller 9 generates the respective drive periods of the phase-A driver 2, and the phase-B driver 3, and the respective sampling frequencies of the phase-A comparator 4, and the phase-B comparator 5 on the basis of the frequency-setting signal outputted by the rotational speed timer 7 to be subsequently outputted. Herein, the respective drive periods of the phase-A driver 2, and the phase-B driver 3 are periods during which current is supplied to the phase-A driver 2, and the phase-B driver 3, respectively, and the respective drive periods can be set on the basis of a duty ratio as well as a frequency of respective drive signals of the phase-A driver 2, and the phase-B driver 3. The rotational speed timer 7 can more finely set the respective drive periods by setting the respective drive periods of the driver 2, and the phase-B driver 3 on the basis of the duty ratio as well as the frequency of the drive signal. Further, the respective sampling frequencies of the phase-A comparator 4, and the phase-B comparator 5 are identical to frequencies of the respective drive signals of the phase-A driver 2, and the phase-B driver 3.

With the electronic flow meter 10, since the respective sampling frequencies of the phase-A comparator 4, and the phase-B comparator 5 are identical to the frequencies of the respective drive signals of the phase-A driver 2, and the phase-B driver 3, the number of the registers described later on can be reduced.

The clock controller 9 combines the clock signal of the low-speed clock 11 including an external oscillator capable of oscillating a clock signal at 32 KHz in frequency with the clock signal of the high speed clock 12 including an external oscillator capable of oscillating a clock signal at 20 MHz or 125 KHz in frequency, thereby generating the sampling frequency based on the frequency-setting signal, and the frequency of the drive signal to be subsequently outputted.

The driver selector 8 selects driving of the phase-A driver 2, or the phase-B driver 3, for use in outputting the driver control signal, on the basis of the drive period outputted by the clock controller 9, and the selection signal outputted by the rotational speed timer 7.

Figure 6:
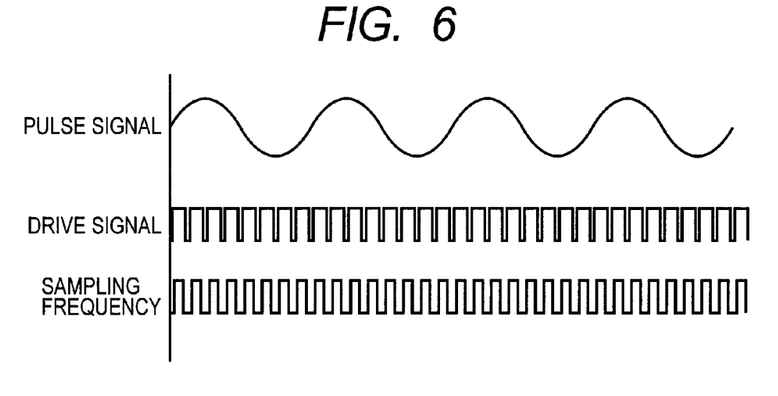
FIG. 6 is a view showing waveforms indicating a phase-A or a phase-B pulse signal, a sampling frequency, and a drive signal, respectively.

FIG. 6 is a view showing waveforms indicating the phase-A or the phase-B pulse signal, the sampling frequency, and the drive signal, respectively. The waveforms shown in FIG. 6 indicate waveforms at a time when the rotational frequency of the impeller is high (a flow rate is high), and the frequency of the phase-A or the phase-B pulse signal is high. In order to obtain the phase-A or the phase-B pulse signal high in frequency, there is the need for extending the respective drive periods of the phase-A driver 2, and the phase-B driver 3, and therefore, the respective drive signals of the phase-A driver 2, and the phase-B driver 3 are rendered higher in frequency, and are increased in duty ratio. Further, in the case where the phase-A or the phase-B pulse signal high in frequency is inputted to the phase-A comparator 4, and the phase-B comparator 5, it is necessary for the phase-A comparator 4, and the phase-B comparator 5 to sample the phase-A or the phase-B pulse signal high in frequency, so that there is the need for raising the sampling frequency as well.

Figure 7:
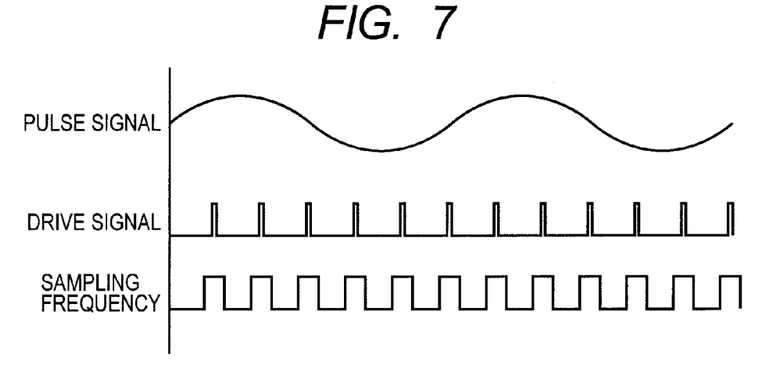
FIG. 7 is a view showing other waveforms indicating the phase-A or the phase-B pulse signal, the sampling frequency, and the drive signal, respectively.

FIG. 7 is a view showing other waveforms indicating the phase-A or the phase-B pulse signal, the sampling frequency, and the drive signal, respectively. The waveform shown in FIG. 7 indicates the waveform at a time when the rotational frequency of the impeller is low (a flow rate is low), and the frequency of the phase-A or the phase-B pulse signal is low. In order to obtain the phase-A or the phase-B pulse signal low in frequency, the respective drive periods of the phase-A driver 2, and the phase-B driver 3 can be shortened, and therefore, the respective drive signals of the phase-A driver 2, and the phase-B driver 3 are rendered lower in frequency, and are decreased in duty ratio. Further, in the case where the phase-A or the phase-B pulse signal low in frequency is inputted to the phase-A comparator 4, and the phase-B comparator 5, it need only be sufficient for the phase-A comparator 4, and the phase-B comparator 5 to sample the phase-A or the phase-B pulse signal low in frequency, so that the sampling frequency can be rendered lower.

If the respective drive periods of the phase-A driver 2, and the phase-B driver 3 can be shortened, this will enable current to be supplied to the magnetic sensor 1 to be inhibited, so that it is possible to reduce an amount of current consumed by the electronic flow meter 10. Further, if the respective sampling frequencies of the phase-A comparator 4, and the phase-B comparator 5 can be rendered lower, it is possible to inhibit current to be supplied to the phase-A comparator 4, and the phase-B comparator 5, respectively, so that the amount of current consumed by the electronic flow meter 10 can be reduced.

Figure 8:
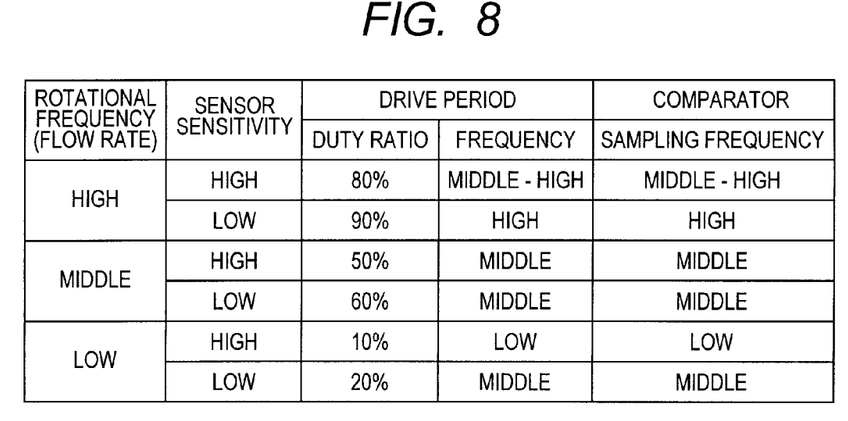
FIG. 8 is a view showing a relationship between respective drive periods of a phase-A driver 2 and a phase-B driver 3, and respective sampling frequencies of a phase-A comparator 4 and a phase-B comparator 5, in relation to a rotational frequency of an impeller.

FIG. 8 is a view showing a relationship between the respective drive periods of the phase-A driver 2 and the phase-B driver 3, and the respective sampling frequencies of the phase-A comparator 4 and the phase-B comparator 5, in relation to the rotational frequency of the impeller. In FIG. 8, the rotational frequency of the impeller is classified into three levels of High, Middle, and Low, and the sensor sensitivity of the magnetic sensor 1 is classified into two levels of High, and Low. Further, with the magnetic sensor 1, even if the higher the sensor sensitivity is, the more the respective drive periods of the phase-A driver 2, and the phase-B driver 3 are shortened, it is possible to obtain a desired phase-A or phase-B pulse signal.

In the case where the rotational frequency of the impeller is high, and the sensor sensitivity of the magnetic sensor 1 is high, the duty ratio of the drive signal is set to 80%, and the frequency thereof is set to a range of the middle to the high level in the respective drive periods of the phase-A driver 2, and the phase-B driver 3 while the respective sampling frequencies of the phase-A comparator 4, and the phase-B comparator 5 are set to a range of the middle to the high level. In the case where the rotational frequency of the impeller is high, and the sensor sensitivity of the magnetic sensor 1 is low, the duty ratio of the drive signal is set to 90%, and the frequency thereof is set to the high level in the respective drive periods of the phase-A driver 2, and the phase-B driver 3 while the respective sampling frequencies of the phase-A comparator 4, and the phase-B comparator 5 are set to the high level.

In the case where the rotational frequency of the impeller is at around the middle level, and the sensor sensitivity of the magnetic sensor 1 is high, the duty ratio of the drive signal is set to 50%, and the frequency thereof is set to the middle level in the respective drive periods of the phase-A driver 2, and the phase-B driver 3 while the respective sampling frequencies of the phase-A comparator 4, and the phase-B comparator 5 are set to around the middle level as well. In the case where the rotational frequency of the impeller is at around the middle level, and the sensor sensitivity of the magnetic sensor 1 is low, the duty ratio of the drive signal is set to 60%, and the frequency thereof is set to the middle level in the respective drive periods of the phase-A driver 2, and the phase-B driver 3 while the respective sampling frequencies of the phase-A comparator 4, and the phase-B comparator 5 are set to around the middle level as well.

In the case where the rotational frequency of the impeller is low, and the sensor sensitivity of the magnetic sensor 1 is high, the duty ratio of the drive signal is set to 10%, and the frequency thereof is set to the low level in the respective drive periods of the phase-A driver 2, and the phase-B driver 3 while the respective sampling frequencies of the phase-A comparator 4, and the phase-B comparator 5 are set to the low level. In the case where the rotational frequency of the impeller is low, and the sensor sensitivity of the magnetic sensor 1 is low, the duty ratio of the drive signal is set to 20%, and the frequency thereof is set to the middle level in the respective drive periods of the phase-A driver 2, and the phase-B driver 3 while the respective sampling frequencies of the phase-A comparator 4, and the phase-B comparator 5 are set to around the middle level.

In FIG. 8, there has been described the case where combinations of the rotational frequency of the impeller and the sensor sensitivity of the magnetic sensor 1 are classified into six varieties, thereby variously setting the respective drive periods of the phase-A driver 2, and the phase-B driver 3, and the respective sampling frequencies of the phase-A comparator 4, and the phase-B comparator 5. However, it is to be understood that, with the electronic flow meter 10 according to the first embodiment of the invention, the combinations be not limited thereto. Further, with the electronic flow meter 10, if the combinations are classified into greater varieties, and the respective drive periods of the phase-A driver 2 and the phase-B driver 3, and the respective sampling frequencies of the phase-A comparator 4 and the phase-B comparator 5, are variously set, it is necessary to set up the number of the stages of the registers in both the compare register 72, and the frequency-setting register 74, in such a way as to match the number of the varieties, respectively.

As described in the foregoing, with the electronic flow meter 10 according to the first embodiment of the invention, the rotational speed timer 7 calculates the rotational frequency of the impeller from the event count signal outputted by the two-phase encoder 6, and sets the respective sampling frequencies of the phase-A comparator 4, and the phase-B comparator 5 at the time when the rotational frequency of the impeller is measured next time, together with the respective drive periods of the phase-A driver 2, and the phase-B driver 3, in accordance with the rotational frequency of the impeller as calculated, so that the respective drive periods of the phase-A driver 2, and the phase-B driver 3 can be changed so as to match fluctuation in the sensor sensitivity of the magnetic sensor 1, and the rotational frequency of the impeller can be stably detected by the magnetic sensor 1. Further, with the electronic flow meter 10 according to the first embodiment of the invention, the respective sampling frequencies of the phase-A comparator 4, and the phase-B comparator 5, and the respective drive periods of the phase-A driver 2, and the phase-B driver 3 can be varied in more stages than the three stages of the low speed, the intermediate speed, and the high speed, in accordance with the rotational frequency of the impeller, so that the amount of current consumed can be reduced.

Further, in the rotational speed timer 7, the set values of the respective frequencies at the levels retained in the level buffer immediately before the frequency measurement-cycle timer is turned high, can be read respectively, so that the respective sampling frequencies of the phase-A comparator 4, and the phase-B comparator 5 at the time when the rotational frequency of the impeller is measured next time, and the respective drive periods of the phase-A driver 2, and the phase-B driver 3 can be automatically set. For this reason, the rotational speed timer 7 need not activate an arithmetic circuit, such as a CPU (Central Processing Unit), and so forth, in order to set the respective sampling frequencies of the phase-A comparator 4, and the phase-B comparator 5 at the time when the rotational frequency of the impeller is measured next time, and the respective drive periods of the phase-A driver 2, and the phase-B driver 3, so that the amount of current consumed can be reduced.

Further, with the electronic flow meter 10, if the compare registers in any suitable number of stages are set up, this will enable more varieties of the respective drive periods of the phase-A driver 2, and the phase-B driver 3 as well as the respective sampling frequencies of the phase-A comparator 4, and the phase-B comparator 5 to be set according to the flow rate, and so forth, so that the amount of current consumed can be further reduced.

Furthermore, with the electronic flow meter 10, signals are analogically processed by the phase-A driver 2, and the phase-B driver 3 as well as the phase-A comparator 4, and the phase-B comparator 5, while signals are digitally processed by the two-phase encoder 6, the rotational speed timer 7, and so forth.

Second Embodiment

Figure 9:
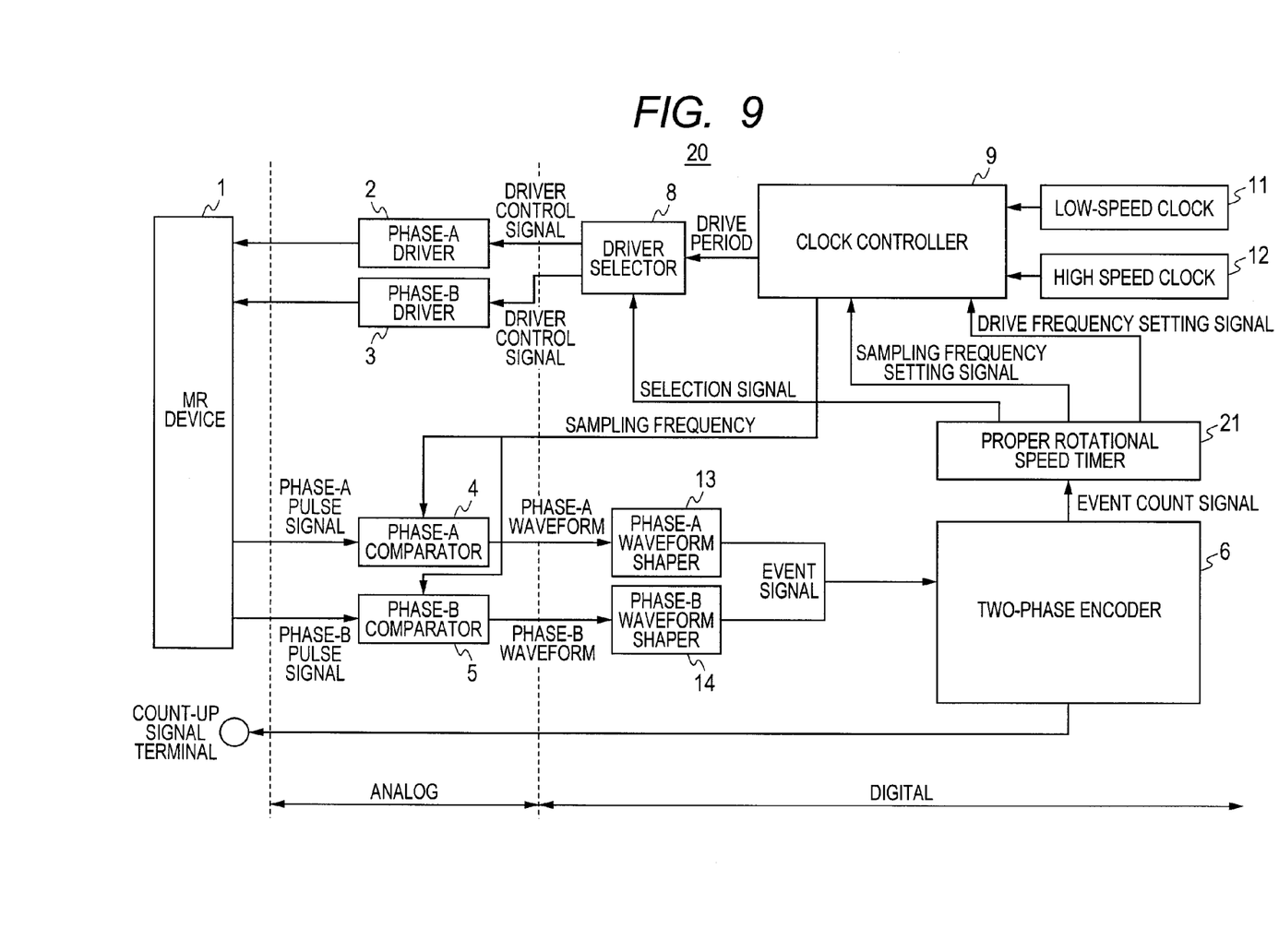
FIG. 9 is a block schematic diagram showing a configuration of an electronic flow meter according to a second embodiment of the invention.

FIG. 9 is a block schematic diagram showing a configuration of an electronic flow meter according to a second embodiment of the invention. An electronic flow meter 20 shown in FIG. 9 includes a magnetic sensor 1, a phase-A driver 2, a phase-B driver 3, a phase-A comparator (a first comparator) 4, a phase-B comparator (a second comparator) 5, a two-phase encoder 6, and a proper rotational speed timer 21.

Further, the electronic flow meter 20 includes a driving-driver selector 8 for selecting driving of the phase-A driver 2, or the phase-B driver 3, and a clock controller 9 for generating respective sampling frequencies of the phase-A comparator 4, and the phase-B comparator 5 during respective drive periods of the phase-A driver 2, and the phase-B driver 3, subsequently outputting the respective sampling frequencies.

Further, the electronic flow meter 20 includes a low-speed clock 11, and a high speed clock 12, for supplying the clock controller 9 with a clock signal, respectively, a phase-A waveform shaper 13 for shaping a waveform outputted by the phase-A comparator 4, and a phase-B waveform shaper 14 for shaping a waveform outputted by the phase-B comparator 5.

Since the electronic flow meter 20 is identical in configuration to the electronic flow meter 10 according to the first embodiment shown in FIG. 1 except for the proper rotational speed timer 21 that differs in configuration, identical constituent elements of the electronic flow meter 20 are denoted by like reference numerals, omitting therefore repeated description thereof, in detail.

The proper rotational speed timer 21 calculates a rotational frequency of the impeller from an event count signal outputted by the two-phase encoder 6. Further, the proper rotational speed timer 21 outputs a sampling-frequency setting signal for setting respective sampling frequencies of the phase-A comparator 4, and the phase-B comparator 5 at a time when the rotational frequency of the impeller is measured next time, and a drive-frequency setting signal for setting respective drive periods of the phase-A driver 2, and the phase-B driver 3, respectively, to the clock controller 9 in accordance with the rotational frequency of the impeller as calculated. Further, the proper rotational speed timer 21 outputs a selection signal for selecting a destination of a driver control signal to the driver selector 8.

Figure 10:
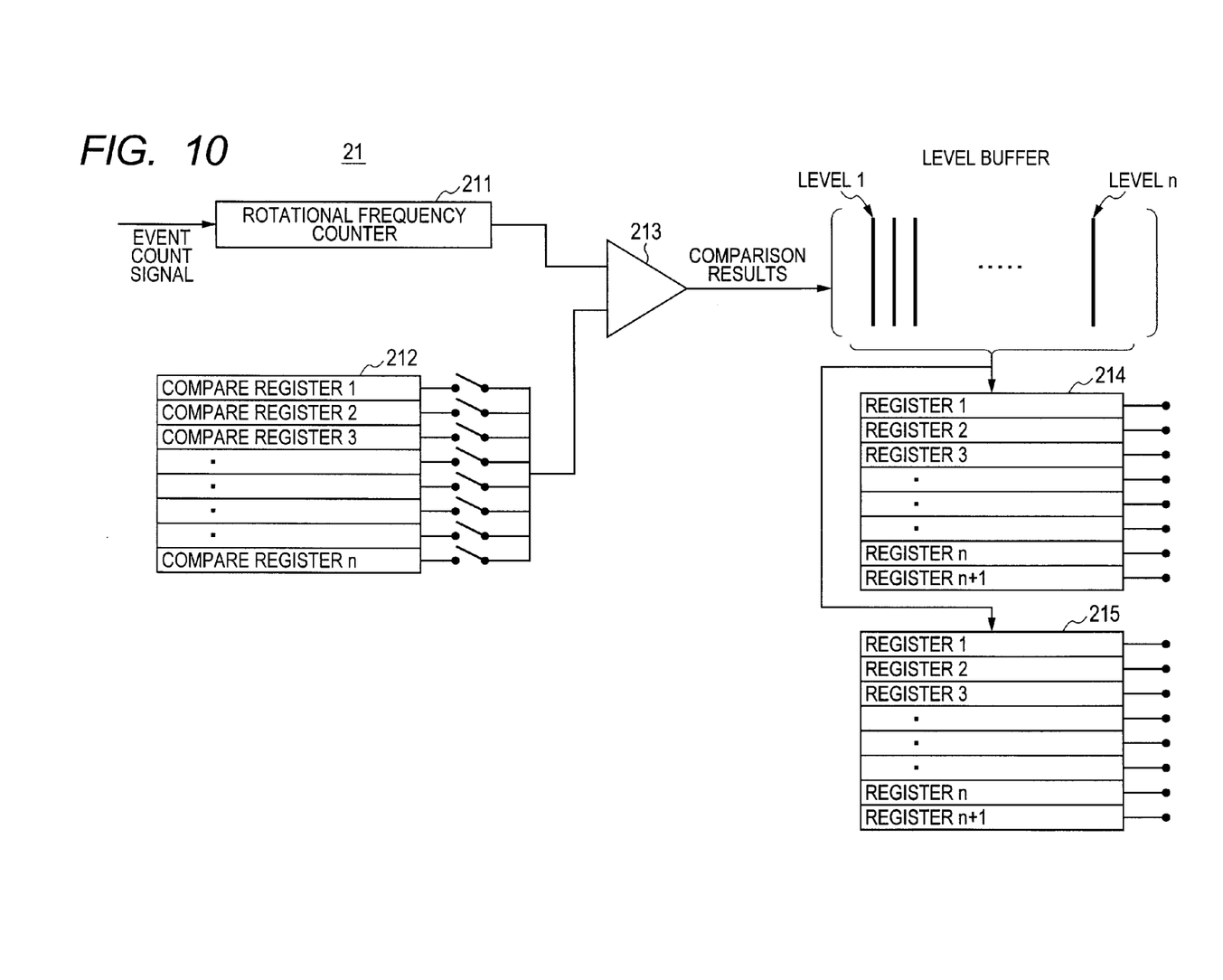
FIG. 10 is a block diagram showing a configuration of a rotational speed timer of an electronic flow meter according to the second embodiment of the invention.

FIG. 10 is a block diagram showing a configuration of the rotational speed timer 21 of the electronic flow meter 20 according to the second embodiment of the invention. The proper rotational speed timer 21 shown in FIG. 10 includes a rotational frequency counter 211, a compare register 212, a comparator 213, and a sampling-frequency setting register 214, and a drive-frequency setting register 215.

The rotational frequency counter 211 calculates the rotational frequency of the impeller from the event count signal outputted by the two-phase encoder 6. The compare register 212 includes n-stages of compare registers, a rotational frequency threshold (a compare match) corresponding to a frequency to be set being retained in the compare registers in the respective stages. The comparator 213 compares the rotational frequency of the impeller, calculated by the rotational frequency counter 211, with the respective compare matches retained in the compare register 212, outputting a level according to a comparison result. The sampling-frequency setting register 214 includes (n+1)-stages of registers, a set value of a sampling frequency corresponding to a level outputted by the comparator 213 being retained in the registers in the respective stages. The drive-frequency setting register 215 comprises (n+1)-stages of registers, a set value of a drive-frequency corresponding to the level outputted by the comparator 213 being retained in the registers in the respective stages.

The proper rotational speed timer 21 is provided with the sampling-frequency setting register 214, and the drive-frequency setting register 215, and is capable of independently setting the sampling-frequency setting signal, and the drive-frequency setting signal, respectively. The rotational speed timer 21 is identical in operation to the rotational speed timer 7 excepting that the rotational speed timer 21 is capable of independently setting the sampling-frequency setting signal, and the drive-frequency setting signal, respectively, omitting therefore repeated description thereof.

As described above, with the electronic flow meter 20 according to the second embodiment of the invention, the rotational speed timer 21 is capable of independently setting the sampling-frequency setting signal, and the drive-frequency setting signal, respectively, so that it is possible to the respective drive periods of the phase-A driver 2, and the phase-B driver 3 as well as the respective sampling frequencies of the phase-A comparator 4, and the phase-B comparator 5 can be more finely set in accordance with a flow rate, and so forth, thereby enabling the amount of current consumed to be further reduced.

Third Embodiment

Figure 11:
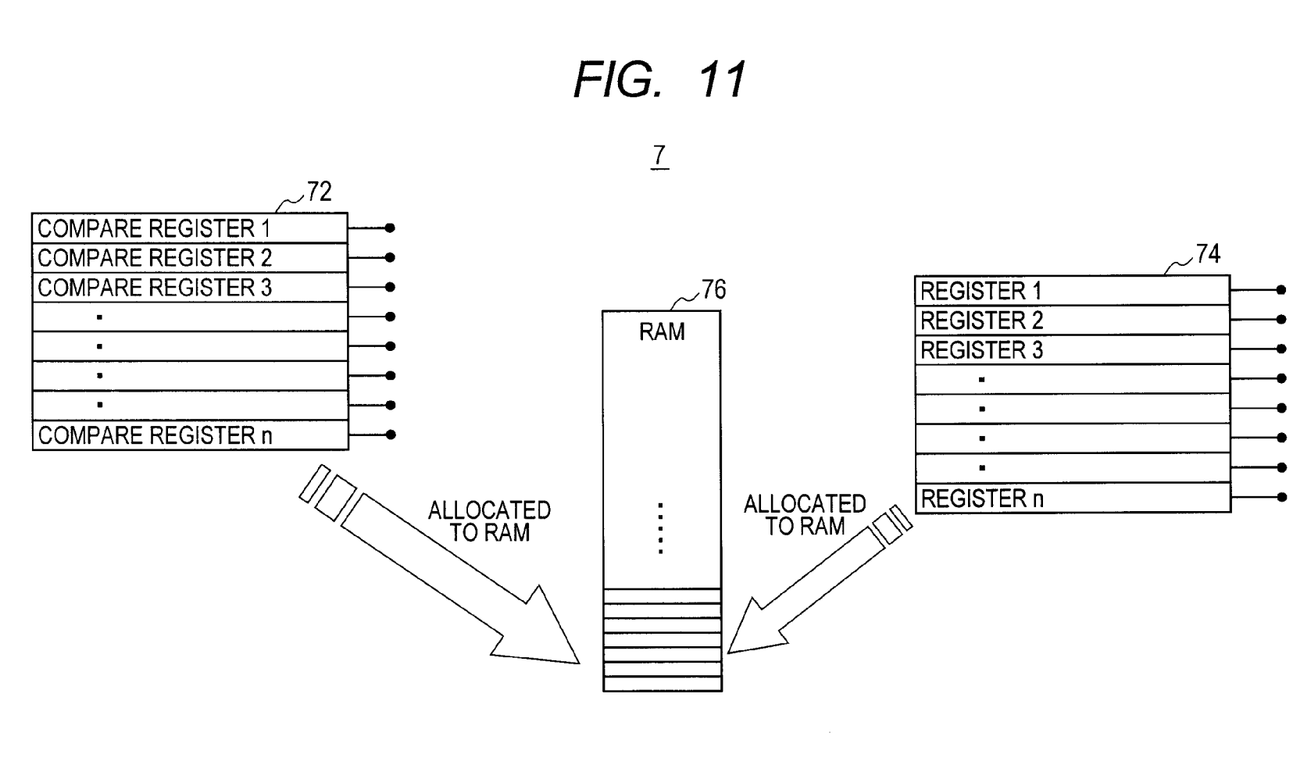
FIG. 11 is a schematic representation showing a configuration of a rotational speed timer of an electronic flow meter according to a third embodiment of the invention.

FIG. 11 is a schematic representation showing a configuration of a rotational speed timer 7 of an electronic flow meter according to a third embodiment of the invention. In FIG. 11 showing the rotational speed timer 7, there is depicted a configuration whereby a compare register 72, and a frequency-setting register 74 are allocated to a RAM (Random Access Memory) 76. The configuration of the rotational speed timer 7 is identical in other respects to the configuration shown in FIG. 4, omitting therefore repeated depiction.

In a memory region of the RAM 76, there are allocated rotational frequency thresholds (compare matches) retained in respective the stages of the compare register 72, and respective set values of the frequencies retained in the respective stages of the frequency-setting register 74. For this reason, with the rotational speed timer 7 according to the third embodiment of the invention, there is no need for having the compare register 72, and the frequency-setting register 74 in terms of a hardware configuration, so that circuit portions for the compare register 72, and the frequency-setting register 74, respectively, can be eliminated, thereby cutting back on a circuitry scale.

Further, with the rotational speed timer 7 of the electronic flow meter according to the third embodiment of the invention, there is no need for supplying power for use in operating the compare register 72, and the frequency-setting register 74, so that the amount of current consumed can be reduced.

Further, if the electronic flow meter according to the third embodiment of the invention is provided with a DTC (Date Transfer controller), or a DMAC (Direct Memory Access Controller), both the rotational frequency threshold (the compare match) retained in each of the stages of the compare register 72, and the set value of the frequency retained in each of the stages of the frequency-setting register 74, allocated to the RAM 76, can be read and written without activating the CPU.

Furthermore, the RAM 76 can make use of a region other than the memory region where the rotational frequency threshold (the compare match) retained in each of the stages of the compare register 72, and the set value of the frequency, retained in each of the stages of the frequency-setting register 74 are allocated, as a memory region of the CPU, and so forth.

As described above, with the rotational speed timer 7 according to the third embodiment of the invention, since the rotational frequency threshold (the compare match) retained in each of the stages of the compare register 72, and the set value of the frequency, retained in each of the stages of the frequency-setting register 74 are allocated to the RAM 76, it is possible to scale back on the circuitry and to reduce the amount of current consumed.

Still further, the invention is not limited to the case where the rotational frequency threshold (the compare match) retained in each of the stages of the compare register 72, and the set value of the frequency, retained in each of the stages of the frequency-setting register 74 are allocated to the RAM 76. The set value of the sampling frequency, retained in each of the stages of the frequency-setting register 214, and the set value of the drive-frequency, retained in each of the stages of the drive-frequency setting register 215, as described with reference to the second embodiment, may be allocated to the RAM 76.

While the invention has been described in its preferred embodiments as above, it is to be understood that such description is for illustrative purpose only and that the invention be not limited to any of details of the description. It is our intention that changes and variations may be made without departing from the equivalent spirit as well as the scope of the following claims.

What is claimed is:

1. An electronic flow meter comprising:
   magnetic sensors that magnetically detect a rotational frequency of a rotator rotating according to a flow rate of a fluid and output first and second signals, respectively according to the rotational frequency of the rotator as detected;
   drivers that drive the magnetic sensors, respectively;
   a first comparator that samples the first signal outputted by the magnetic sensor on the basis of a sampling signal;
   a second comparator that samples the second signal outputted by the other magnetic sensor on the basis of the sampling signal;
   a two-phase encoder that determines whether the rotator is rotating in a normal direction or a reverse direction on the basis of the first and second signals sampled by the first and second comparators, respectively and causes a counter to count up or to count down according to the normal or the reverse direction as determined, thereby outputs an event count signal; and
   a rotational speed timer that works out the rotational frequency of the rotator from the event count signal outputted by the two-phase encoder, and sets frequencies of the respective sampling signals of the first and second comparators at a time when the rotational frequency of the rotator is measured next time, and respective drive periods of the drivers in accordance with the rotational frequency of the rotator as calculated.

2. The electronic flow meter according to claim 1, wherein the respective drive periods of the drivers are set on the basis of a duty ratio as well as a frequency of a drive signal supplied to each of the magnetic sensors.

3. The electronic flow meter according to claim 2, wherein the frequency of the sampling signal is set so as to be identical to the frequency of the drive signal supplied to each of the magnetic sensors.

4. The electronic flow meter according to claim 2, wherein the frequency of the sampling signal is set so as to differ from the frequency of the drive signal supplied to each of the magnetic sensors.

5. The electronic flow meter according to claim 4, wherein the rotational speed timer includes a plurality of registers for retaining the rotational frequency of the rotator, the frequencies of the respective sampling signals of the first and second comparators, corresponding to the rotational frequency of the rotator, and the respective drive periods of the drivers, and comparing the rotational frequency of the rotator, calculated from the event count signal, with the rotational frequencies of the rotator, stored in the plural registers, thereby setting the frequencies of the respective sampling signals of the first and second comparators, and the respective drive periods of the drivers.

6. The electronic flow meter according to claim 5, wherein the rotational speed timer allots information to a memory circuit instead of storing the information in the plural registers, the information including the rotational frequency of the rotator, the frequencies of the respective sampling signals of the first and second comparators, corresponding to the rotational frequency of the rotator, and the respective drive periods of the drivers.

* * * * *